United States Patent [19]

Maxwell et al.

[11] 4,389,503
[45] Jun. 21, 1983

[54] OPAQUE JET INK COMPOSITIONS

[75] Inventors: Dorothy Maxwell; David A. Fell, both of Neenah, Wis.

[73] Assignee: American Can Company, Greenwich, Conn.

[21] Appl. No.: 372,820

[22] Filed: Apr. 28, 1982

Related U.S. Application Data

[62] Division of Ser. No. 177,944, Aug. 14, 1980, Pat. No. 4,352,901.

[51] Int. Cl.$^3$ .......................... C08L 1/14; C08K 5/06; C08L 93/00; C08K 5/07

[52] U.S. Cl. .......................... 524/38; 524/41; 524/755; 524/765; 106/22; 106/26; 106/189; 523/160; 523/171; 523/218; 346/1.1; 346/75

[58] Field of Search ................... 524/38, 41, 732, 755, 524/765; 523/160, 171, 218; 106/14.5, 20, 21, 22, 26, 189; 346/1.1, 75, 140 R

[56] References Cited

U.S. PATENT DOCUMENTS

| | | | |
|---|---|---|---|
| 3,031,328 | 4/1962 | Larsen | 427/394 |
| 3,654,193 | 4/1972 | Seiner | 521/63 |
| 4,195,104 | 3/1980 | Fell | 427/261 |
| 4,207,577 | 6/1980 | Mansukhani | 346/1.1 |
| 4,290,072 | 9/1981 | Mansukhani | 427/335 |

*Primary Examiner*—John Kight, III
*Assistant Examiner*—Nathan M. Nutter
*Attorney, Agent, or Firm*—Ernestine C. Bartlett; Stuart S. Bowie

[57] ABSTRACT

The present invention relates to non-pigmented jet ink compositions and to a method of producing opaque coded messages therewith. The compositions comprise, on a weight basis, between 2 and 15% of a gellable cellulose ester having a hydroxyl content of from 2 to 8%, from 1.5 to 15% of a binding agent selected from the group consisting of alkali soluble rosin type and maleic type resins, polyvinyl acetate resins, and acrylic resins, and a solvent blend, the blend consisting essentially of an organic solvent system and a non-solvent, said non-solvent comprising from 2 to 10% by weight of the ink compositions. Preferred solvents are methanol, acetone, methyl ethyl ketone and ethyl acetate, while the preferred non-solvent is water. Upon evaporation of the solvent blend, the resultant dry films scatter light incident thereto whereby the opaque images are produced. In a particularly preferred embodiment, a hygroscopic salt is included in the composition as an opacity enhancement agent.

11 Claims, No Drawings

OPAQUE JET INK COMPOSITIONS

This is a division of application Ser. No. 177,944, filed Aug. 14, 1980, now U.S. Pat. No. 4,352,901.

FIELD OF INVENTION

This invention relates to non-pigmented jet ink compositions that dry opaque, particularly to compositions that dry opaque white, or opaque yellow, and to their application onto non-porous substrates. The ink compositions, which are suitable for use in high speed jet ink printing systems, contain a cellulose ester film former and a resin binder in a solvent blend. It is believed that the resulting film, obtained upon evaporation of the solvent blend, has a reticulated structure containing a multiplicity of microvoids, the microvoids scattering light incident thereupon, whereby the white opaque image is produced.

BACKGROUND OF THE INVENTION

Jet ink printing systems discharge discrete droplets of ink through a fine jet nozzle to the substrate. In this method of printing, unlike letter press, gravure, silk screen and comparable printing techniques, there is no contact between the printer and article to be printed. The ink droplets have a defined resistivity so that they can be deflected by an electric field when discharged from the nozzle. The jet ink printing system is of considerable importance in applying decorative and identifying indicia to a variety of substrates, including glass, metal and synthetic polymeric surfaces. U.S. Pat. Nos. 3,465,350 and 3,465,351 are exemplary of these systems.

Ink to be used with jet printing means have specific viscosity and resistivity limitations, should provide good wettability of the substrate, and must be quick drying and smear resistant. Further, the ink must be compatible both with the jet printing equipment and in the eventual end use application. With regard to the former it is critical that the ink flow through the fine jet nozzles without clogging same.

Typically, jet inks consist of three basic components—a colorant such as a dye or pigment; a resin binding agent which serves to secure or adhere the colorant to the substrate surface, and a carrier fluid or solvent for the colorant or binding agent, the carrier fluid evaporating upon application of the ink. In jet printing inks, an electrolyte is often employed to ensure that the droplets can be adequately charged whereby proper deflection is achieved. U.S. Pat. No. 4,021,252 issued to Banczak et al is representative of this genre of jet printing inks. Banczak uses from one to 25% by weight shellac as the binding agent, between 0.5 and 5% by weight of a basic dye as the colorant, and a solvent blend consisting of water and alcohol. Optionally the solvent blend may be modified by the addition of a glycol ether to solubilize colorants of limited solubility.

Other prior art patents reflective of the Banczak approach are listed below, some of which are for specific end use applications:

| U.S. Pat. No. | |
|---|---|
| 4,024,096 | Wachtel |
| 4,070,322 | Hwang et al |
| 4,155,767 | Specht et al |
| 4,155,895 | Rohowetz et al |
| 4,168,254 | Fell |
| 4,168,662 | Fell |

| -continued | |
|---|---|
| 4,177,075 | Mansukhani |
| 4,186,020 | Wachtel |
| 4,196,006 | Mansukhani |
| 4,196,007 | Mansukhani |
| German Offenlegungsschrift | |
| 28 12 364 (Published October 1978) | M & T Chemicals |

To produce an opaque white image utilizing the ink formulations of the above identified prior art references, it would be necessary to use a pigment such as rutile titanium dioxide. However, this opacifying agent is present in the solvent as a dispersed solid, and tends to settle out of solution thereby clogging the jet nozzle. This drawback is even more pronounced in low viscosity jet inks which are preferred. Other disadvantages of conventional pigmented inks are that they usually require curing at elevated temperatures, and/or have extended drying times. The goal of the present invention, then, is to provide non-pigmented jet inks that produce opaque white images on non-porous substrates, and which can be applied to said substrates in a single operating step.

As is well known in the art, a solution of certain compounds, particularly the cellulose esters, when applied to a surface will dry opaque white. See generally, Jerome Seiner, *Microvoids As Pigments. A Review*, Indusrial and Engineering Chemistry, Product Research & Development, Vol. 17, pp. 302–317 (Dec. 12, 1978) and J. J. Clancy, *Microvoid Coatings in Graphic Art Application. A Patent Survey*, Industrial and Engineering Chemistry, Product Research & Development, Vol. 13, No. 1, pp. 30–34 (March 1974). A sampling of patents issued with respect to such compositions follows:

| U.S. Pat. No. | 1,449,157 | Wilkie |
|---|---|---|
| | 2,296,337 | Cummings |
| | 2,519,660 | James |
| | 2,739,909 | Rosenthal |
| | 2,927,039 | Vander Weel |
| | 3,020,172 | Mohnhaupt |
| | 3,031,328 | Larsen |
| | 3,654,193 | Seiner |
| | 3,655,591 | Seiner |

The above inventions are related to paints, paper coatings, and recording materials.

More recently, U.S. Pat. No. 4,207,577 to Mansukhani applied this technology to jet inks. The Mansukhani patent discloses a two-step procedure for obtaining opacity, the second step being either an adjustment of the temperature of the applied film to the ambient dew point, or by applying moisture thereto. In an alternate embodiment a basic dye is used in the ink formulation, the film then being moistened with water. The method above is applied to a general ink composition consisting of cellulose esters, binding agents and a solvent blend. The two step approach of Mansukhani represents a serious limitation in the use of his ink in certain applications. For example, some products are sensitive and can not undergo the second "moisturing" step. Other products are humidity sensitive. Similarly, printing on a hot surface will drive off the solvents before the second step can be accomplished. Finally, the Mansukhani method requires the addition of a second step treatment zone to existing product conveying systems.

SUMMARY OF INVENTION

It is an object of this invention to provide improved non-pigmented jet ink compositions, suitable for use with jet ink printing techniques, that provide opaque films.

It is another object of this invention to provide improved non-pigmented jet ink compositions that dry opaque white and which are suitable for use on metal, glass and other non-porous substrates.

Yet another object of this invention is to provide a jet ink that dries opaque white which has good stability and shelf life.

A related aspect of this invention is to provide a method for obtaining substrates having identifying indicia, said indicia derived by application of the jet ink compositions of the present invention by means of jet ink printing techniques. In this regard, the indicia as applied to non-porous substrates exhibit ready adhesion thereto, are abrasion and fade resistent, and can withstand post application conditions of moisture and elevated temperature.

It is a primary object of this invention to obtain substrates having said identifying indicia by means of a one step method not involving a post cure treatment of the film to render it opaque.

A further object of the invention is to provide a method for reconstituting cycled ink used in the printing operation.

These and other objects of the invention will be better understood from a reading of the detailed description of the invention, a summary of which follows.

The jet ink formulations disclosed herein comprise a film forming cellulose ester having a hydroxyl content between 2 to 8%, a resin binding agent, and a solvent blend. Preferred cellulose esters are cellulose acetate propionates, cellulose acetate butyrates and cellulose acetates, while the binding agent may be selected from a wide range of alkali soluble resins of the rosin ester and meleic types as well as polyvinyl acetate and acrylic resins. The solvent blend consists essentially of at least one volatile organic solvent within which the film forming cellulose ester is soluble in combination with one or more non-solvents of reduced volatility within which the film forming cellulose ester is essentially insoluble, and which is miscible with the organic solvent. Volatile components of the solvent blend comprise from about 70 to 90% by weight of the ink composition, and are selected from the group consisting of aliphatic alcohols of one to three carbon atoms, ketones of three to seven carbon atoms, and acetates of four to seven carbon atoms. The non-solvent is present in concentration from about 2 to 10% by weight of the ink composition, the preferred non-solvent being water.

In use, the ink is fed from a supply reservoir to the nozzle of the jet printing apparatus and then dispensed as a coded series of droplets onto the substrate. Evaporation of the solvent blend from the droplets is achieved rapidly, the indicia turning opaque thereupon. Because the amount of ink actually printed is quite small, most printers transfer ink from the supply reservoir in a larger, more controllable volume, apply only the small quantity needed to the substrate, and send the excess to a return tank. However, the entire flow of ink from the supply reservoir discharges through the nozzle at atmospheric conditions, the resulting flash vaporization causing a change in the cycled ink composition present in the return tank. For this reason it is preferred to reconstitute the cycled ink with make-up solution consisting essentially of the organic solvent, but also including if necessary non-solvent and ink solids. The make-up ink is formulated specifically to re-attain approximately the supply reservoir composition for subsequent re-use of the cycled ink.

DETAILED DESCRIPTION OF THE INVENTION

The non-pigmented jet ink compositions of the present invention contain a film forming cellulose ester, a resin binding agent and a solvent blend therefor hereinafter described. The composition may optionally contain other ink solids such as dyes, optical brighteners, surfactants, hygroscopic salts, and electrolytes. As used herein, pigment and dyes comprise the class of compounds defined as colorants. Pigments, generally being insoluble, dry powders, are incompatible with the invention; dyes, typically being soluble organic compounds, may be included to provide enhanced visibility of the opaque image on a particular substrate.

Each of the primary constituents must be in proper proportion to achieve both suitability for the jet ink printing apparatus and for coating a particular substrate. To meet these use requirements, the following standards should be attained:

(1) inks should dry essentially instantly or be smear resistant upon application with subsequent complete drying in about 60 seconds, preferably in less than 30 seconds, without a post cure;

(2) ink viscosity should be between from about 1.5 to about 25 centipoise, preferably between 1.5 and 18 centipoise;

(3) indicia printed on glass must exhibit ready adhesion thereto, be abrasion and fade resistant, and have the ability to withstand conditions of moisture and elevated temperature encountered generally during conventional pasteurization operations;

(4) as applied to metal or synthetic polymer coating surfaces, the indicia must exhibit resistance to fading and be able to maintain adhesion under pasteurization conditions when immersed in an aqueous solution for 15 minutes at 150° F.;

(5) indicia printed on bottles must exhibit resistance to removal by lubricant soaps conventionally used by commercial bottlers on conveying lines, and (6) inks should have a minimum shelf life of about one month.

Fade resistance as used herein means that indicia should remain opaque on the substrate for a period of not less than three months. Shelf life is defined as the ability of the ink itself to render opaque white films upon use after storage at ambient conditions for no less than one month.

COMPONENTS OF THE COMPOSITION

Investigations into the many film formers, the large array of binding agents, and the broad spectrum of solvent species and concentrations that can be hypothecated by a reading of the prior art revealed that the aforesaid properties of the ink, the characteristics of the indicia, and the one-step approach to film formation could be achieved only with the proper combination of compatible prime constituents. Thus, for example, adhesion to the substrate was poor unless the proper resin were used. The selection of resin, however, was a function of solvent blend employed and film former chosen. The ability to form an opaque film was likewise dependent on the compatibility of the constituents. Similarly, suitable shelf life was obtained by using the appropriate solvent blend—film former—resin ingredients.

The Film Former and Binding Agent

The film former used in the ink composition must be a cellulose ester whose percent hydroxyl content ranges from between 2.0% to about 8.0%, preferably between 4.0% to 6.0%. The ester is present in concentrations from about 2.0 to 15.0% by weight of the composition, preferably from between 3.0 to 10.0% by weight of the ink formula. It is critical that the film former be gellable in the non-solvent as will be more extensively described below. Hence, while the film former is soluble in the volatile organic solvent constituents of the solvent blend, it is essentially insoluble in the less volatile non-solvent. Furthermore, the ink system should have a viscosity between 1.5 to 25 cp., preferably between 1.5 and 18 cp. at the ester concentrations stated above for use with jet printing equipment. Preferred film formers are cellulose acetate propionate, cellulose acetate butyrate, cellulose acetate and combinations of same, each having a preferred hydroxyl content between 4.0 and 6.0% of the ester, and are available commercially from Eastman Chemical Company.

The resin binding agent is used to improve the adhesion of the film to the substrate. It is believed that the ester film has a planar structure providing few sites for attachment to a surface. The binding agent apparently provides molecular projections which attach to the substrate. One class of appropriate binding agents are rosin based ester resins or maleic resins soluble in the ink solvent system and also soluble in the non-solvent. Dissolution of these resins in the non-solvent in many instances is enhanced by a somewhat basic environment. Therefore, it is often preferred to adjust the pH of the ink to between 8 and 9 when they are used by the addition of an effective amount of dilute ammonium hydroxide or the equivalent. Examples of such compounds are Alresat KM140, a rosin modified maleic anhydride resin (American Hoescht); UniRez 757, a maleic resin (Union Camp), and Filtrez 5001, a fumaric rosin based resin (FRP Company).

Preferred binding agents that can be used are polyvinyl acetate resins, acrylic type resins, and their copolymers. Commercially available resins of this type are Synthacryl VSC 75/1, an acrylic resin (American Hoescht); Gelva #264 and Gelva #V1 ½, polyvinyl acetate resins (Monsanto), and NS26-1314, a carboxylated polyvinyl acetate resin copolymer (National Starch). As with the rosin and maleic resins, the preferred resins should be soluble in the ink solvent, and should also be soluble in water or dilute alkali solutions. In commercial form many of these binding agents themselves are in solution, the solvents therefor necessarily being compatible with the ink itself.

The binding agent is present in the ink composition in an amount between 1.5 to 15% by weight, although the preferred range is between 2 and 8% by weight. Necessarily, the agent must be compatible with the cellulose ester film former, and generally has a viscosity in a 50% by weight solution of dilute aqueous alkali of less than 15,000 cps., preferably less than 2000 cps. The melting point should be above 150° F. Binding agent percentages stated herein are on a resin solvent free basis.

The Solvent Blend

In the description of the solvent blend, the following definitions are employed:

Solvent Blend—the mixture of a more volatile solvent and a less volatile non-solvent.

Solvent—the more volatile portion of the solvent blend within which the film former and resin is soluble. Where more than one solvent is used, the term solvent system has been employed.

Non-solvent—the less volatile portion of the solvent blend within which the film former is essentially insoluble.

The solvent blend consists essentially of at least one or more volatile solvents and at least one less volatile non-solvent. The amount of solvent in the blend must be sufficient to completely dissolve the film former notwithstanding the diminution of solvating power of the blend by the addition of non-solvent thereto. Its volatility should be such that substantial evaporation of the solvent takes place rapidly, preferably within 2 to 3 seconds, upon application of the ink composition to the substrate. However, the solvent must also be compatible with the jet ink printer. For example, ethers such as ethyl ether have been found to be suitable solvents yet are not preferred because they are incompatible with gaskets and seals typically used in the printing equipment and form dangerous reaction products with oxygen. Another requirement of the solvent is that it should evaporate uniformly from the film former and binder. That is, the solvent should be present in solution with the non-solvent and dissolved solid constituents throughout the initial evaporation period and at least until the onset of gellation as will hereinafter be described.

Conversely, the non-solvent, which is present in concentration ranging between 2 and 10% by weight of the composition, should be less volatile so that the non-solvent remains subsequent to the evaporation of the solvent. Of course, the rate of evaporation of individual constituents of the blend will be dependent on their relative volatilities, and as evaporation takes place the solvent blend will become increasingly non-solvent rich. It is also preferable that the solvent blend constituents not form an azeotrope that will solubilize the film former.

Water is the preferred non-solvent, although glycerin has also been found to be a suitable substitute. Water is preferred not only because it forms the desired gel with the film former, but also because its viscosity is low relative to its vapor pressure. Thus, when used in proper amounts, the viscosity of the ink composition ranges between 1.5 and 25 cp. as noted above.

Solvents acceptable for use in the blend are aliphatic alcohols having from one to three carbons, aliphatic ethers having from four to ten carbons, aliphatic ketones of three to seven carbons, and aliphatic acetates of three to seven carbons, none of which form an azeotrope that will dissolve the film former. In addition, two or more solvents can be combined within the blend, and such combinations are preferred in balancing the volatility, viscosity, density and resistivity properties of the ink composition. For example, methanol is a suitable solvent. However, solvent systems comprising methanol-acetone, methanol-methyl ethyl ketone, and methanol-acetone-methyl ketone have been found more effective. Similarly, the methanol-ethyl acetate and methanol-acetone-ethyl acetate solvent systems have been used with success. Generally, however, alkyl acetates and ketones should not be present in amounts above about 50% by weight of the solvent. As parameters for achieving a usable solvent system for incorporation into the solvent blend, it is desirable for the relative drying time of the solvent system to be in the range between one and nine as compared with ethyl ether having an arbitrary drying time of 1.0 (quick drying), and for the viscosity to be between from about 0.2 and 1.2 cp. Preferably, the ink composition contains at least 30% by weight methanol. The remaining solvent blend constituents are, as a weight percent of the ink composition, preferably between 20 and 50% acetone, from 0 to about 25% methyl ethyl ketone, and from 0% to about 25% ethyl acetate. The solvent system is between 70% and 90% by weight of the ink composition. The solvent blend, including nonsolvent and solvent, in combination with the film former and the binding agent, comprises the ink composition, except for minor concentrations of miscellaneous additives hereinafter described.

Other Ingredients

In general the resistivity of the ink should be between 100 and 3500 ohm/cm., preferably between 500 and 2000 ohm/cm. In some instances the solvent blend or the resin binding agent used will satisfy this requirement. However, electrolytes can be added optionally to maintain the specific resistivity of the ink within desired limits for use in video jet printing equipment. Satisfactory compounds include dimethylamine hydrochloride, sodium propionate, sodium acetate, and the like. In addition, it has been found that the addition of a hygroscopic salt and preferably a deliquescent salt such as dimethylamine hydrochloride or lithium chloride in an amount between 0.05 and 3%, preferably between 0.1 and 1.0%, by weight of the composition also enhances the opacity of the dried film. Hence, such hygroscopic/deliquescent salts are the preferred electrolytes, and may be included even though the resistivity is within an acceptable range without their addition.

Finally, small amounts, generally no more than 2.0% each by weight, of conventional basic dyes, surfactants, and optical brighteners, can be included in the composition. A dye is useful when a white image does not show up clearly on a particular substrate. However, the film produced is still opaque, and relies on the mechanism described below for visibility. Particularly advantageous dyes for use herein are yellow. Typical yellow dyes are Morfast Yellow 101, an azo-type dye and Morfast yellow 102, a metal-complexed azo-type dye, both avaiable from Morton-Norwich Company. The above dyes are supplied as a 50% solution, with isopropanol as the solvent. When used, these dye solutions typically comprise 0.5% to 4% by weight of the ink composition.

Another acceptable yellow dye is Neozapon Yellow GG, also a metal-complexed azo-type dye, available from BASF Wyandotte Company.

MECHANISM FOR PRODUCING WHITE OPAQUE IMAGES

It is believed that the following events take place to form the film which produces the opaque images.

Upon deposition of the ink on the substrate, the solvent blend evaporates rapidly. Because of the difference in relative volatility between the solvent and non-solvent, the cellulose ester film former and binding agent remain behind in a progressively non-solvent rich residuum of the solvent blend. As the concentration of non-solvent increases, the film former, which is insoluble in the non-solvent, forms a gel with but a portion of the remaining solvent blend. The surplus of solvent blend not entrapped within the gel is present as microdroplets amid the gel. Upon subsequent complete evaporation of the solvent blend, now principally the non-solvent species therein, a reticulated film is produced over the substrate, the microdroplets having produced a network of microvoids both within and on the surface of the film, said microvoids scattering incident light thereby making the film opaque.

USE OF THE INK COMPOSITION

A continuous stream of ink is transferred from a pressurized supply reservoir for discharge as droplets from a printing nozzle at ambient conditions. The pressure in the reservoir is sufficient to overcome transfer line and nozzle pressure drops, said pressure being about 10 to 50 psia. The disposition of the droplets exiting the nozzle is dependent on whether a coded message is to be printed on a substrate. Assuming that the coded message is not to be printed, the droplets are recaptured proximate to the nozzle and cycled back to a return tank. Because the nozzle discharges to atmosphere, it is necessary that the return tank be under vacuum, the return tank pressure being about 4–6 psia.

When an article to be encoded passes beneath the printer nozzle, a portion of the droplet stream is deflected by a pre-set series of electric signals thereby causing the coded message to be printed. The bulk of the droplets, however, continue to be recaptured for transfer to the return tank. This system is used because the actual amount of ink necessary for printing the coded messages is substantially smaller than the volumetric flow rate through the printing equipment required for meaningful control. Droplets applied to the substrate turn opaque rapidly, generally within a few seconds, by means of the mechanism postulated above.

Make-up Solution

Because of the flash vaporization which occurs at the nozzle, and the reduction in pressure in the return tank, the composition of the ink in the return tank is different than the ink in the supply reservoir. For this reason it is necessary to reconstitute the former for eventual re-use by the addition of make-up solution. The make-up formulation is a function of the rate of loss of the ink constituents, and consists essentially of the volatile solvent species, but may also include non-solvent and ink solids. In general, make-up is added intermittently. The return tank is mounted on a weigh scale, and as evaporation occurs, an automatic valve is actuated to allow make-up solution to be transferred from a make-up reservoir to the return tank. Alternately, a property of the ink could be monitored, e.g., specific gravity, to actuate the transfer. Because the rate of loss is dependent upon the actual ink composition and operating conditions, the make-up solution composition should be determined a priori by a trial and error procedure.

The examples below further illustrate the teachings of this disclosure:

EXAMPLE 1.

The ink formulation which follows was used successfully to print white opaque videojet codes on glass and black cable:

|  |  | pbw |
| --- | --- | --- |
| Cellulose Acetate Propionate (Eastman CAP 504-0.2) | Film Former | 4.32 |
| Polyvinyl Acetate (Monsanto Gelva #264) | Binding Agent: Resin | 2.14 |
|  | Ethanol | 2.61 |
| Methanol | Solvent | 86.4 |
| Water | Non-Solvent | 4.32 |
| Dimethylamine Hydrochloride (DMA.HCl) | Electrolyte; Opacifier | 0.20 |
| Total |  | 99.99 |

The use of cellulose acetate propionate has been found to be the most preferred film former of those tested. Publication No. E-169D from Eastman indicates that CAP 504-0.2 has the following properties:

| Viscosity | 0.2 seconds (ASTM D-1343 with Formula A, D-817) |
| --- | --- |
| Specific Gravity | 1.263 25°/4° C. |
| Melting Range | 188-210° C. |
| Hydroxyl Content | 5.0 wt. % (avg.) |
| Propionyl Content | 40.0 wt. % (avg.) |
| Acetyl Content | 2.5 wt. % (avg.) |

Gelva #264 is a vinyl type resin whose viscosity is between 7000 and 11000 cps. in a 55-57% ethanol solution by weight. For computing solvent blend constituent concentrations, the resin solvent should be taken into account. Conversely, resin concentrations defined herein are on a dry basis.

The ink produced according to this formulation had a Brookfield viscosity of 4.0 centipoises at 24.5° C. and a resistivity of 800 ohm/cm. at 24.5° C.

EXAMPLE 2

In this example, the solvent comprises a mixture of methanol and acetone, the acetone being used to reduce the viscosity of the ink composition.

|  |  | pbw |
| --- | --- | --- |
| Cellulose Acetate Propionate (Eastman CAP 504-0.2) | Film Former | 8.0 |
| Acrylic Resin (American Hoescht Synthacryl VSC 75/1) | Binding Agent: Resin | 2.8 |
|  | Isopropanol | 2.8 |
|  | Water | 1.4 |
| Methanol | Solvent | 40.0 |
| Acetone | Solvent | 50.0 |
| Water | Non-Solvent | 6.0 |
| Dimethylamine Hydrochloride | Electrolyte; Opacifiers | 0.2 |
| Total |  | 111.20 |

This composition had a Brookfield viscosity of 6.11 centipoises at 24.5° C., and produced a smear resistent printed code about two seconds after application to the substrate.

EXAMPLE 3

|  | pbw |
| --- | --- |
| CAP 504-0.2 | 7.0 |
| Synthacryl VSC 75/1 | 6.0 |
| Methanol | 44.5 |
| Acetone | 26.5 |
| Methyl Ethyl Ketone | 9.0 |
| Water | 5.8 |
| Surfactant | 1.0 |
| DMA.HCl | 0.2 |
| Total | 100.0 |

The Brookfield viscosity was 5.6 cps. and the resistivity was 800 ohm-cm., each at 24.5° C. This ink was life tested and produced opaque images upon use after 1000 hours of storage at ambient conditions.

In conjunction with the use of this ink on the jet printing apparatus, the following make-up solution was employed:

|  | ml. (25° C.) |
| --- | --- |
| Acetone | 1425 |
| Methanol | 1110 |
| Methyl Ethyl Ketone | 230 |
| Ink (as stated above) | 234 |
|  | 2999. |

EXAMPLES 4-9

Table I provides further examples of the use of cellulose acetate propionate in combination with various resin compounds and solvent blends.

TABLE I

| Constituent, pbw | Example No. | | | | | |
| --- | --- | --- | --- | --- | --- | --- |
|  | 4* | 5 | 6 | 7 | 8 | 9 |
| CAP 504-0.2 | 60 | 6.0 | 6.0 | 8.0 | 7.0 | 4.5 |
| Binding Agent: | Resin 60 | Resin 5.0 | Resin 2.4 Ethanol 3.6 | Resin 2.6 Isopropanol 0.4 Water 4.0 | Resin 2.4 Isopropanol 2.4 Water 1.2 | Resin 2.0 Ethanol 2.5 |
|  | (Resin modified maleic resin, Alresat KM140, American Hoescht) | (Maleic resin, UniRez 7083, Union Camp Corp.) | (Carboxylated polyvinyl acetate, NS - 26 - 1314, National Starch) | (Acrylic resin, Acrysol 1-100, Rohm and Haas) | (Syntharcyl VSC 75/1) | (Gelva #264) |
| Methanol | 805 | 82.0 | 84.0 | 40.0 | 57.5 | 85.5 |
| Acetone |  |  |  | 30.0 |  |  |
| MEK |  |  |  | 20.0 |  |  |
| Ethyl Acetate |  |  |  |  | 25.0 |  |
| Water | 65 | 7.0 | 5.0 | 6.0 | 4.0 | 4.5 |
| DMA.HCl |  |  |  | 0.2 | 0.5 |  |
| Optical Brigthener | 15 (HM-35, DayGlo Corp.) |  |  |  |  |  |
| Surfactant | 20 (FC 170C, 3M Corp.) |  |  |  | 1.0 (FC 170C) | 0.5 (Arquad 2C-75, Armak Chemicals) |

TABLE I-continued

| Constituent, pbw | Example No. | | | | | |
|---|---|---|---|---|---|---|
| | 4* | 5 | 6 | 7 | 8 | 9 |
| Dye | 2 (Yellow GG, BASF Wyandotte) | | | | | |
| TOTAL, pbw | 1027 | 100.0 | 101.0 | 111.2 | 100.5 | 99.5 |

*Sufficient NH₄OH to raise pH to 8.5

EXAMPLE 10

This ink composition shows the use of cellulose acetate butyrate, which has a hydroxyl content of 4.3%.

| | pbw |
|---|---|
| Cellulose Acetate Butyrate (Eastman CAP 533-0.4) | 6.0 |
| Acrylic Resin (Synthacryl VSC 75/1) | 7.0 |
| Methanol | 45.0 |
| Acetone | 20.0 |
| Methyl Ethyl Ketone | 9.0 |
| Water | 7.0 |
| DMA.HCl | 0.2 |
| Total | 94.2 |

The examples above are intended to be illustrative only, and are not to be construed as in any way limiting the invention defined by the claims which follow.

We claim:

1. A method of producing opaque indicia with jet printing apparatus consisting essentially of the steps of
    (1) providing a jet ink composition consisting essentially of (A) 2 to 15% by weight of a gellable cellulose ester film former having a hydroxyl content of between 2 to 8% by weight, (B) between 1.5 and 15% of a binding agent selected from the group consisting of rosin based ester resins and maleic type resins soluble in dilute alkali solutions, polyvinyl acetate resins, acrylic resins, polyvinyl acetate and acrylic copolymer resins, and combinations of the same, and (C) a solvent blend, the solvent blend being a mixture of (1) a solvent selected from the group consisting of aliphatic alcohols of one to three carbons, ethers of four to ten carbons, acetone, other aliphatic ketones of four to seven carbons, acetates of three to seven carbons, and compatible combinations of the same, said acetates and other ketones being less than 50% of the solvent present in the composition, and (2) a non-solvent of low volatility within which the film former is essentially insoluble, the non-solvent being between 2 and 10% by weight of the jet ink composition, said solvent blend not containing an azeotrope that solubilizes the film former, and the binding agent being soluble in the solvent blend;
    (2) dispensing said ink composition in a continuous stream of electrically deflectable droplets onto a non-porous substrate at essentially ambient conditions to form indicia, whereby rapid auto-evaporation of the solvent blend forms a gelled film comprising residual solvent blend, cellulose ester and binding agent; said gelled film containing a multiplicity of microdroplets of solvent blend comprising substantially the non-solvent component of the ink composition, further auto-evaporation of the remaining solvent blend forming a reticulated ester-resin film having a multiplicity of microvoids, said microvoids scattering light incident thereto rendering said dry film opaque.

2. The method of claim 1 wherein said gellable cellulose ester is selected from the group consisting of cellulose acetate propionate, cellulose acetate and cellulose acetate butyrate.

3. The method of claim 2 wherein said non-solvent is water or glycerin.

4. A method of producing an opaque coded message on a non-porous substrate with jet printing apparatus comprising the steps of:
    (1) providing a jet ink composition having a viscosity between 1.5 and 25 centipoises at 25° C. and consisting essentially of from 3 to 10% of cellulose acetate propionate having a hydroxyl content of between 4 and 6%, from 2 to 8% of a binding agent selected from the group consisting of acrylic resins and polyvinyl acetate resins, and a solvent blend consisting essentially of at least 30% methanol, from 20 to 50% acetone, from 0 to 25% of a solvent selected from the group consisting of methyl ethyl ketone, ethyl acetate and combinations of the same and between 2 and 10% water, the percentages being on a weight basis;
    (2) discharging a continuous stream of said ink composition from a pressurized supply reservoir through a jet printing nozzle as a steady stream of electrically deflectable droplets under ambient conditions;
    (3) passing a non-porous substrate beneath said nozzle, a portion of the droplets being deflected thereto in response to pre-set electrical signals to form the coded message, said message becoming opaque upon auto-evaporation of the ink solvent blend; and
    (4) transferring the remainder of the ink discharged from the nozzle to an ink return tank under vacuum.

5. The method of claim 1 wherein the indicia produced are smear resistant substantially upon application and dry in about 60 seconds without a post cure.

6. The method of claim 4 wherein the coded messages produced are smear resistant substantially upon application and dry in about 60 seconds without a post cure.

7. The method of claim 4 wherein the ester-resin film dries opaque white.

8. The method of claim 4 wherein the ester-resin film dries opaque yellow.

9. The method of claim 4 wherein the coded messages dry in about 30 seconds.

10. The method of claim 4 further comprising the step of periodically adding make-up solution to the return tank, said make-up solution being formulated to reconstitute the cycled ink contained therein.

11. The method of claim 10 wherein the make-up solution comprises essentially solvent species of the solvent blend, with 0-15% by volume being the ink composition used in the method.

* * * * *